US007397146B2

(12) United States Patent
Ijuin et al.

(10) Patent No.: US 7,397,146 B2
(45) Date of Patent: Jul. 8, 2008

(54) CHILD LOCK APPARATUS

(75) Inventors: Hidetoshi Ijuin, Wako (JP); Taizo Kikuchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 331 days.

(21) Appl. No.: 11/085,352

(22) Filed: Mar. 21, 2005

(65) Prior Publication Data

US 2005/0218660 A1 Oct. 6, 2005

(30) Foreign Application Priority Data

Mar. 23, 2004 (JP) ............................ 2004-084248

(51) Int. Cl.
*B60L 1/00* (2006.01)
*B60L 3/00* (2006.01)
*H02G 3/00* (2006.01)

(52) U.S. Cl. ........................................................ 307/10.1

(58) Field of Classification Search ................. 307/10.1
See application file for complete search history.

(56) References Cited

U.S. PATENT DOCUMENTS 5,777,546 A * 7/1998 Dean et al. .................. 340/438
6,116,664 A * 9/2000 Wegner ...................... 292/216
6,135,513 A * 10/2000 Hamada et al. ............. 292/201

FOREIGN PATENT DOCUMENTS

JP 5-61430 9/1993

* cited by examiner

*Primary Examiner*—Michael J Sherry
*Assistant Examiner*—Carlos Amaya
(74) *Attorney, Agent, or Firm*—Hamre, Schumann, Mueller & Larson, P.C.

(57) ABSTRACT

A child lock apparatus is capable of electrically controlling a child lock function, which disables a door opening operation when a door of a vehicle is opened from a vehicle cabin side by operating a door inner handle. The child lock apparatus includes a child lock mechanism which child-locks the door, and a controller which controls the child lock mechanism based on driving conditions of the vehicle detected by a driving condition detector. The controller controls the child lock mechanism to child-lock the door if the driving condition detector detects that the vehicle is running.

18 Claims, 5 Drawing Sheets

CHILD LOCK APPARATUS

BACKGROUND OF THE INVENTION

The present invention generally relates to a child lock apparatus which disables a door opening operation made by a door inner handle positioned in a vehicle cabin, so as to prevent an unintentional door opening operation.

When a child sits, for example, in the back seat of an automobile, he or she may manipulate a door inner handle of a door and unintentionally open the door. In order to prevent such an unintentional door opening operation, there is provided a child lock apparatus which disables the door opening operation even if the door inner handle is manipulated from the vehicle cabin side.

Japanese Patent Publication No. H05-61430 (claims and FIG. 4) discloses a conventional child lock apparatus, which includes a child lever for locking and unlocking a child lock. The child lever is provided at one end surface of the door that faces to the vehicle body, and it is connected to a switch (lock release manipulation switch) so that the operating condition of the child lever is outputted to a control circuit (a flip-flop circuit, a first AND gate circuit, a second AND gate circuit, an actuator drive circuit, etc.) in accordance with the ON/OFF signal of the switch. When the child lever is manipulated to lock the child lock, the control circuit supplies an electric current to the actuator to operate the same, so that the door is child-locked and is not opened by the door inner handle.

However, in the above conventional child lock apparatus, the child lever is provided at one end surface of the door that faces to the vehicle body. Therefore, the child lever is not manipulated if the door is closed. In other words, it is necessary to open the door in advance, and thus locking/unlocking the child lock requires complicated operations.

Further, since locking the child lock is manually operated, if the child lock remains inadvertently unlocked by shear mistake, the child lock apparatus does not provide a reliable child lock performance and it allows a child to open the door, by the manipulation of the door inner handle, while the vehicle is running.

In view of the above, the present invention in one preferred mode seeks to provide a child lock apparatus which can reliably child-lock the door during the running of the vehicle.

SUMMARY OF THE INVENTION

It is one aspect of the present invention to provide a child lock apparatus capable of electrically controlling a child lock function, which disables a door opening operation when a door of a vehicle is opened from a vehicle cabin side by operating a door inner handle, the child lock apparatus comprising: a child lock mechanism which child-locks the door; and a controller which controls the child lock mechanism based on driving conditions of the vehicle detected by a driving condition detector; wherein the controller controls the child lock mechanism to child-lock the door if the driving condition detector detects that the vehicle is running.

According to this child lock apparatus, the controller automatically child-locks the door during the running of the vehicle, thereby reliably disabling the door opening operation made by the door inner handle while the vehicle is running. Further, no particular operation is required for setting the child lock. This can save the setting time as well as prevent the door opening operation made by the door inner handle during the running of the vehicle even though the child lock has not been set by mistake.

In the above child lock apparatus, the door may be provided with an automatic opening/closing means for automatically opening and closing the door, and if an operation of the automatic opening/closing means is prohibited, the controller may control the child lock mechanism to child-lock the door.

According to this child lock apparatus, since the automatic opening/closing means such as a power slide door is provided for automatically opening and closing the door, it is necessary to consider a situation for child-locking the door in the case that the operation of the automatic opening/closing means is prohibited. For example, even if prohibiting the operation of the automatic opening/closing means is not sufficient to deal with the case such that the door is manually opened or closed, the door opening operation made by the door inner handle is reliably prevented during the running of the vehicle.

In the above child lock apparatus, if the driving condition detector determines that the vehicle stops while the door has been child-locked, the controller may unlock the child lock at a time when the door inner handle is operated.

According to this child lock apparatus, the child lock is set while the vehicle is running, and the child lock is unlocked if the door inner handle is manipulated while the vehicle stops. Therefore, it is possible to prevent a frequent unlocking operation such that the child lock is unlocked at each time when the vehicle stops.

Further, the manipulation of the door inner handle makes it possible both to unlock the child lock and to open the door at a time, thereby enhancing the convenience.

In the above child lock apparatus, if the driving condition detector determines that the vehicle stops while the door has been child-locked, the controller may unlock the child lock after a certain period of time elapses.

According to this child lock apparatus, the child lock is set while the vehicle is running, and the child lock is unlocked if a certain period of time elapses while the vehicle stops. Therefore, it is possible to keep the reliable child lock until the vehicle stops and to prevent a frequent unlocking operation such that the child lock is unlocked at each time when the vehicle stops.

Further, no particular operation is required for unlocking the child lock, thereby enhancing the convenience.

In the above child lock apparatus, if the driving condition detector determines that the vehicle stops while the door has been child-locked, the controller may unlock the child lock after a certain period of time elapses and at a time when the door inner handle is operated.

According to this child lock apparatus, the child lock is set while the vehicle is running, and the child lock is unlocked if a certain period of time elapses and the door inner handle is manipulated while the vehicle stops. Therefore, it is possible to keep the reliable child lock until the vehicle completely stops. Further, in the case that the vehicle has stopped, the controller unlocks the child lock only when the door inner handle is manipulated. This can prevent the child lock from being unnecessarily unlocked. Also, the manipulation of the door inner handle makes it possible both to unlock the child lock and to open the door at a time, thereby enhancing the convenience.

The above child lock apparatus may further comprise an automatic child lock setting switch for locking and unlocking the child lock, and the controller may control the child lock mechanism in accordance with operating conditions of the automatic child lock setting switch to thereby child-lock the door.

According to this child lock apparatus, providing the automatic child lock setting switch makes it possible to child-lock the door while the vehicle stops, the condition of which is not usually reflected upon setting the child lock based on the driving conditions of the vehicle. Therefore, as is the case with the conventional child lock apparatus, the door opening operation can be prevented not only when the vehicle is running but also when the vehicle stops.

In addition to the setting of the child lock on the basis of the driving conditions, a further condition such as the setting of the child lock by the automatic child lock setting switch is considered. Therefore, a more reliable setting of the child lock is performed while the vehicle is running.

In the above child lock apparatus, even if a manipulation for unlocking the child lock is carried out while the vehicle is running, the controller may continuously child-lock the door.

According to this child lock apparatus, even if a manipulation for unlocking the child lock is carried out while the vehicle is running, the child lock is continuously kept so that the door opening operation by the door inner handle can be reliably prevented during the running of the vehicle.

The above child lock apparatus may further comprise a manual setting switch for locking and unlocking the child lock, which is arranged on the door in such a position to allow an operation thereof with the door open, and the controller may child-lock the door by giving a priority to the manual setting switch over the automatic child lock setting switch.

According to this child lock apparatus, the manual setting switch having similar functions to the automatic child lock setting switch is provided separately to the automatic child lock setting switch. Therefore, the automatic child lock setting switch is provided, for example, at the driver seat, and the manual setting switch is arranged, for example, at the end surface of the door that faces to the vehicle body and in a position where the operation of the manual setting switch is allowed only when the door is open. Further, since the manual setting switch has priority over the automatic child lock setting switch upon locking the child lock, more reliable child lock can be provided. For urgent measures such as malfunction, the child lock can be unlocked by opening the door from the outside of the vehicle and manipulating the manual setting switch.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF THE INVENTION

With reference to the accompanying drawings, preferred embodiments of the present invention will be described below.

Figure 1:
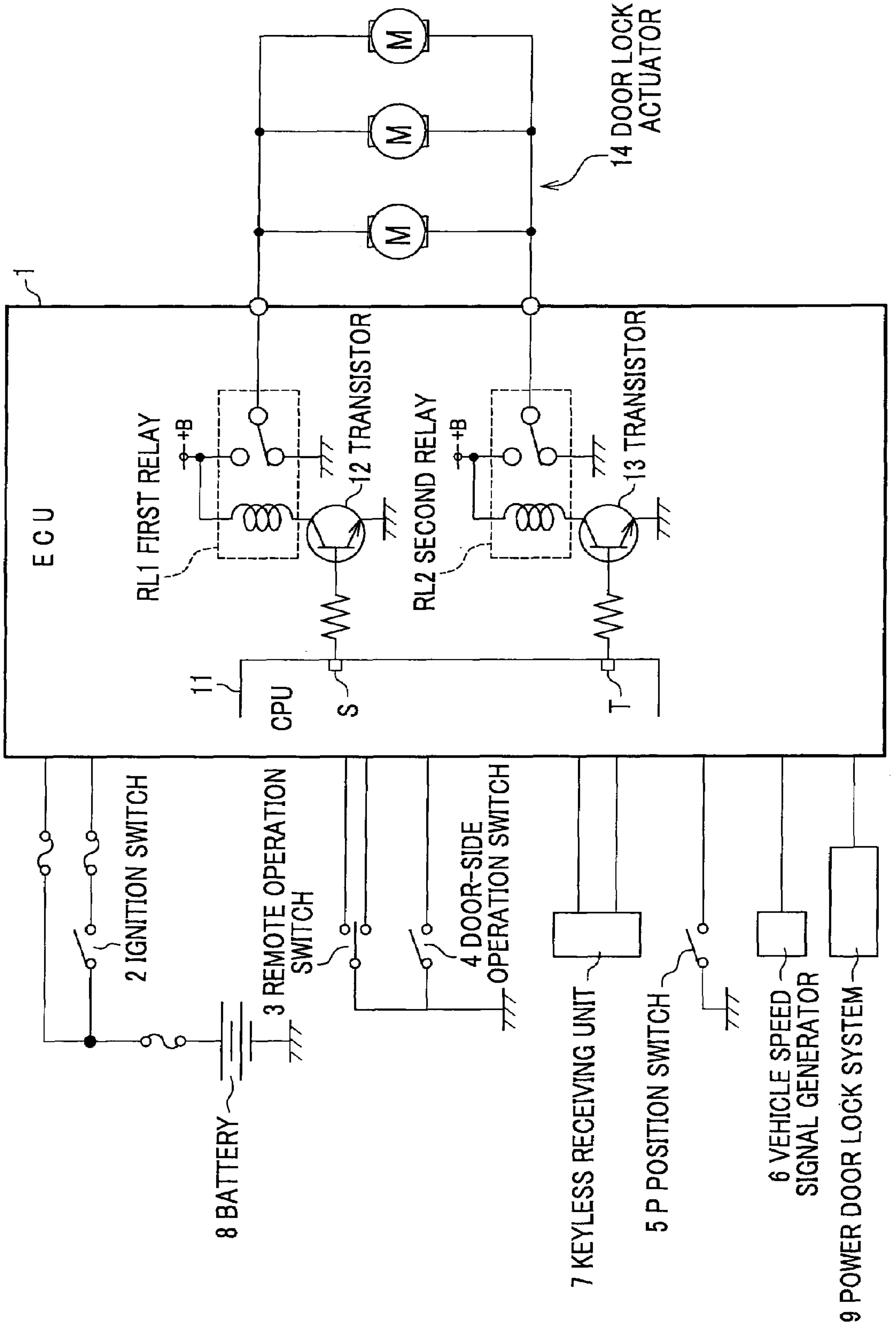
FIG. 1 shows a configuration of a child lock apparatus.

As shown in FIG. 1, a child lock apparatus includes an ECU (Electronic Control Unit) 1, a remote operation switch 3, a door-side operation switch 4, a vehicle speed signal generator 6, a P (Parking) position switch 5, and a door lock actuator 14.

The ECU 1 forms a controller according to the present invention.

The vehicle speed signal generator 6 and the P (Parking) position switch 5 form a driving condition detector according to the present invention.

The remote operation switch 3 forms an automatic child lock setting switch according to the present invention.

Further, the door-side operation switch 4 forms a manual setting switch according to the present invention.

In the following embodiment, the driving condition detector is included in the child lock apparatus as a matter of convenience.

The ECU 1 is operated when a battery 8 supplies electricity. Connected between the battery 8 and the ECU 1 is an ignition switch 2. A high potential is applied to the ECU 1 when the ignition switch 2 is ON, and a low potential is applied to the ECU 1 when the ignition switch 2 is OFF. The ECU 1 determines ON/OFF of the ignition switch 2 in accordance with high or low of the electric potential.

The remote operation switch 3 is installed at a driver seat so that the driver manipulates it. Manipulation of the remote operation switch 3 enables the child lock to be locked or unlocked. Operating condition of the remote operation switch 3 is outputted to the ECU 1 as an electric signal indicating high or low of the electric potential.

Figure 5B:
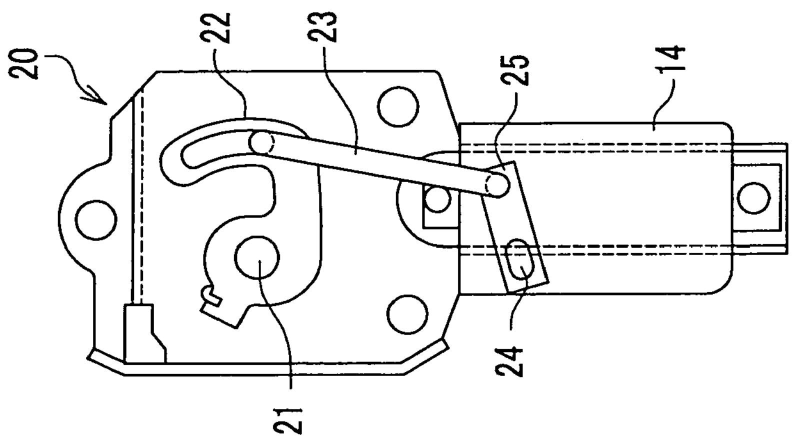
FIG. 5B shows a lock mechanism for locking the door.
Figure 5A:
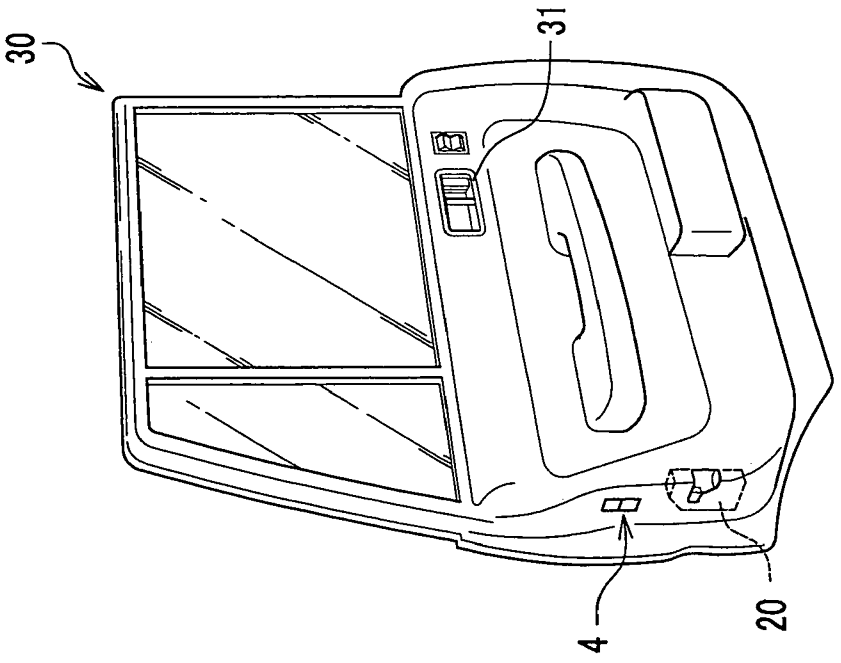
FIG. 5A shows a door.

As shown in FIG. 5A, the door-side operation switch 4 is arranged at an end surface of the door 30 that faces to the vehicle body. The door-side operation switch 4 can be manipulated only when the door 30 is open. Locking or unlocking the child lock is also performed by this door-side operation switch 4. In order to provide a reliable child lock and to easily unlock the child lock at urgent measures such as malfunction, priority is given to the door-side operation switch 4 over the remote operation switch 3.

The vehicle speed signal generator 6 detects a vehicle speed during the running of the vehicle and outputs the vehicle speed as a pulse signal to the ECU 1.

The P (Parking) position switch 5 detects that the shift lever sets in a P (Parking) position. The P position switch 5 detects the position of the shift lever according to high or low of the electric potential and outputs the detection result to the ECU 1.

The ECU 1 includes a CPU (Central Processing Unit) 11, a transistor 12, a transistor 13, a first relay RL1, and a second relay RL2.

A base of the transistor 12 is connected to an output terminal S of the CPU 11 through a resistor, an emitter of the transistor 12 is earthed, and a collector of the transistor 12 is connected to the battery 8 through the first relay RL1.

Further, a base of the transistor 13 is connected to an output terminal T of the CPU 11 through a resistor, an emitter of the transistor 13 is earthed, and a collector of the transistor 13 is connected to the battery 8 through the second relay RL2.

Both of the first relay RL1 and the second relay RL2 are usually connected at their traveling contacts to the stationary contacts on the grounding side. The door lock actuator 14 is arranged on a lock mechanism (FIG. 5) that is provided for each door 30 except for the driver seat, so that the ECU 1 controls to simultaneously child-lock the doors 30 except at the driver seat.

Both ends of the door lock actuator 14 are connected to the traveling contacts of the first relay RL1 and the second relay RL2. When a drive signal is outputted from an output terminal S of the CPU 11, the transistor 12 is driven to operate the first relay RL1 so that an electric current flows to the door lock actuator 14 in the forward direction. The door lock actuator 14 then child-locks the door 30.

When the drive signal is outputted from the output terminal T, the second relay RL2 operates so that an electric current flows to the door lock actuator 14 in the reverse direction. In this instance, the door lock actuator 14 unlocks the child lock of the door 30.

As shown in FIG. 5A, a door outer handle (not shown) and a door inner handle 31 are provided respectively on an outer panel and an inner panel of the door 30. The door outer handle and the door inner handle 31 are operated to open the door 30.

The lock mechanism 20 is embedded in the door 30 at its end surface facing to the vehicle body. The lock mechanism 20 is engageable and disengageable with a striker that is fixed to the vehicle body. As shown in FIG. 5B, abase portion of a lock release lever 22 is fixed to a shaft 21 that is connected to a lock release mechanism (not shown) provided in the lock mechanism 20.

An output shaft 24 of the door lock actuator 14 is fixed to a base portion of an actuation lever 25, and the actuation lever 25 and the lock release lever 22 are connected by a connecting rod 23.

The door inner handle 31 and the door outer handle are respectively connected to a switch. Based on the state of the switch, the ECU 1 determines that the door is opened from the inside of the vehicle cabin or from the outside of the vehicle cabin. The ECU 1 disables the door opening operation made by the door inner handle 31 if the child lock is set.

Therefore, the lock mechanism 20 has a function, other than the normal locking, to lock or unlock the setting of the child lock in consideration of the result that the ECU 1 controls the door lock actuator 14. Although the description has been given to the right-side door of the vehicle, the left-side door has substantially the same construction as the right-side door. To be more specific, when the ECU 1 controls and actuates the door lock actuator 14, locking/unlocking the child lock can be performed for all the doors except the door of the driver seat.

The ECU 1 controls the door lock actuator 14 based on electric potential signals from the ignition switch 2, the remote operation switch 3, the door-side operation switch 4, and the P position switch, and a vehicle speed pulse signal from the vehicle speed signal generator 6.

If the remote operation switch 3 and the door-side operation switch 4 are not set to make the child lock function operative, the ECU 1 controls the door lock actuator 14 to child-lock the door 30 after the ignition switch 2 is ON and the vehicle speed signal generator 6 outputs a vehicle speed signal indicating, for example, the vehicle speed of 5 km/h or more.

If one of the remote operation switch 3 and the door-side operation switch 4 is operated to make the child lock function operative, the ECU 1 controls the door lock actuator 14 to child-lock the door 30 regardless of driving conditions of the vehicle. In this instance, the door opening operation by the door inner handle 31 is disabled, while the door opening operation by the door outer handle is effective so that the door 30 can be opened from the outside of the vehicle. Instead of setting the child lock during the running of the vehicle, it is possible to employ a deadlock for disabling the operations made by both the door inner handle 31 and the door outer handle.

With reference to the time charts of FIGS. 2 through 4, operation of the child lock apparatus will be described.

Figure 2:
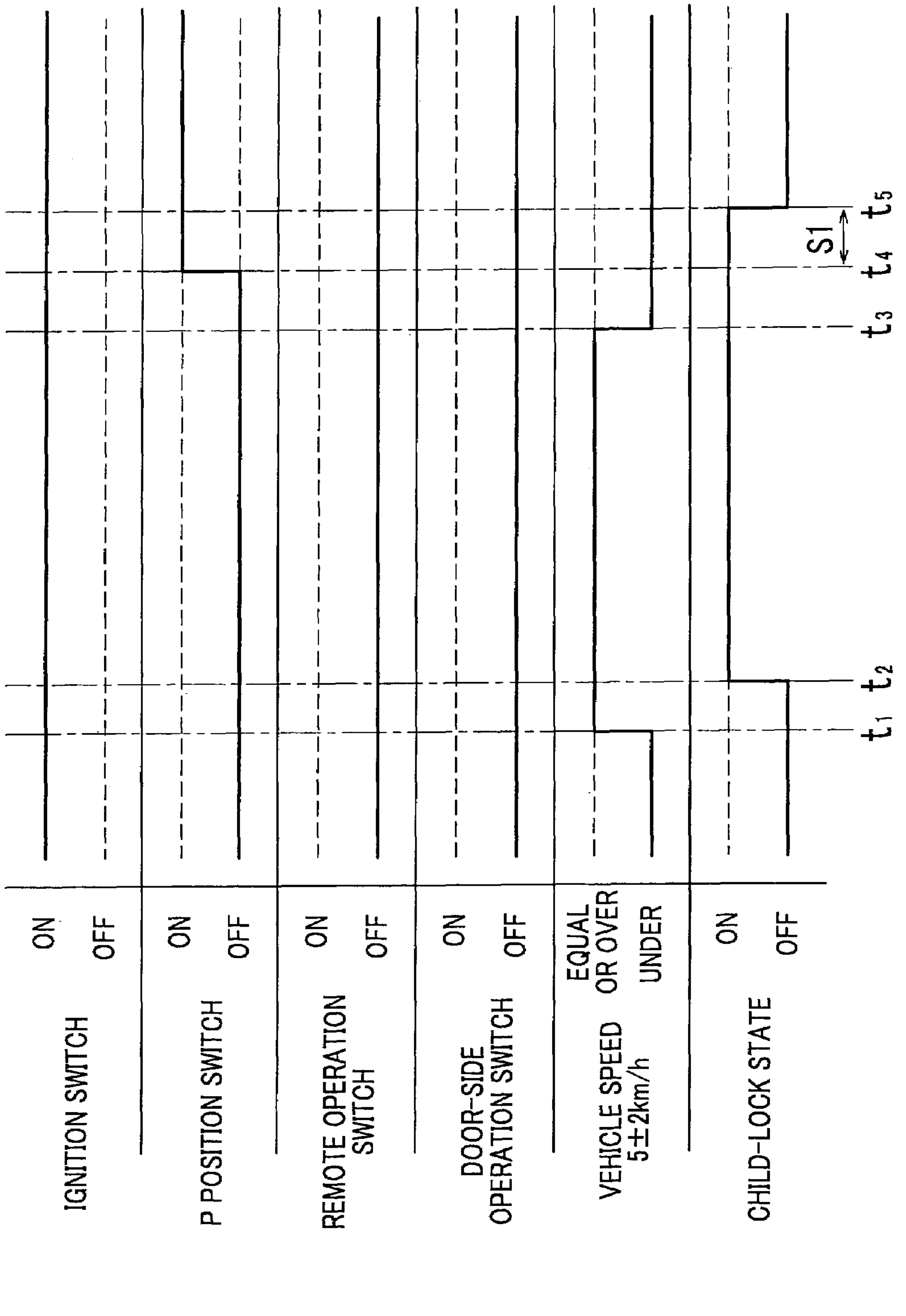
FIG. 2 is a time chart explaining an instance in which a remote operation switch and a door-side operation switch are set to make a child lock function non-operative.

FIG. 2 is a time chart explaining an instance in which the remote operation switch and the door-side operation switch are set to make the child lock function non-operative;

In this example, since both of the remote operation switch 3 and the door-side operation switch 4 are set to OFF, the ECU 1 performs the setting of the child lock on the basis of the condition of the P position switch 5 and the vehicle speed information from the vehicle speed signal generator 6.

When the ignition switch 2 is ON and the vehicle is allowed to run, the ECU 1 determines, based on the vehicle speed signal from the vehicle speed signal generator 6, whether the vehicle speed becomes 5 km/h or more. To consider the detection error, the tolerance of plus/minus 2 km/h is set.

When it is determined that the vehicle speed is 5 km/h or more at the time point t1, the ECU 1 outputs the driving current to the door lock actuator 14 in the forward direction. The door is then child-locked at the time point t2 slightly after the time point t1, and the child-lock state of the door becomes ON.

When the ECU 1 determines that the vehicle speed is less than 5 km/h at the time point t3, the electric potential signal from the P position switch 5 is inputted to the ECU 1. The condition of the P position switch 5 is determined based on the electric potential signal. When the P position switch 5 is ON at the time point t4, it is determined that the vehicle has stopped. At the time point t5 delayed for a certain time S1 from the time point t4, the ECU 1 controls so that an electric current flows to the door lock actuator 14 in the reverse direction. The child-lock is then unlocked, and the child-lock state of the door becomes OFF. The certain time S1 is for retaining the child-lock state while the vehicle is running and until the vehicle stops completely. Providing this certain time S1 can prevent a frequent operation, for example, to unlock the child lock whenever the vehicle stops. It is also possible to unlock the child lock after a certain time S1 elapses and, for example, when the door inner handle 31 is operated. In this instance, the manipulation of the door inner handle makes it possible both to unlock the child lock and to open the door at a time, thereby enhancing the convenience.

Figure 3:
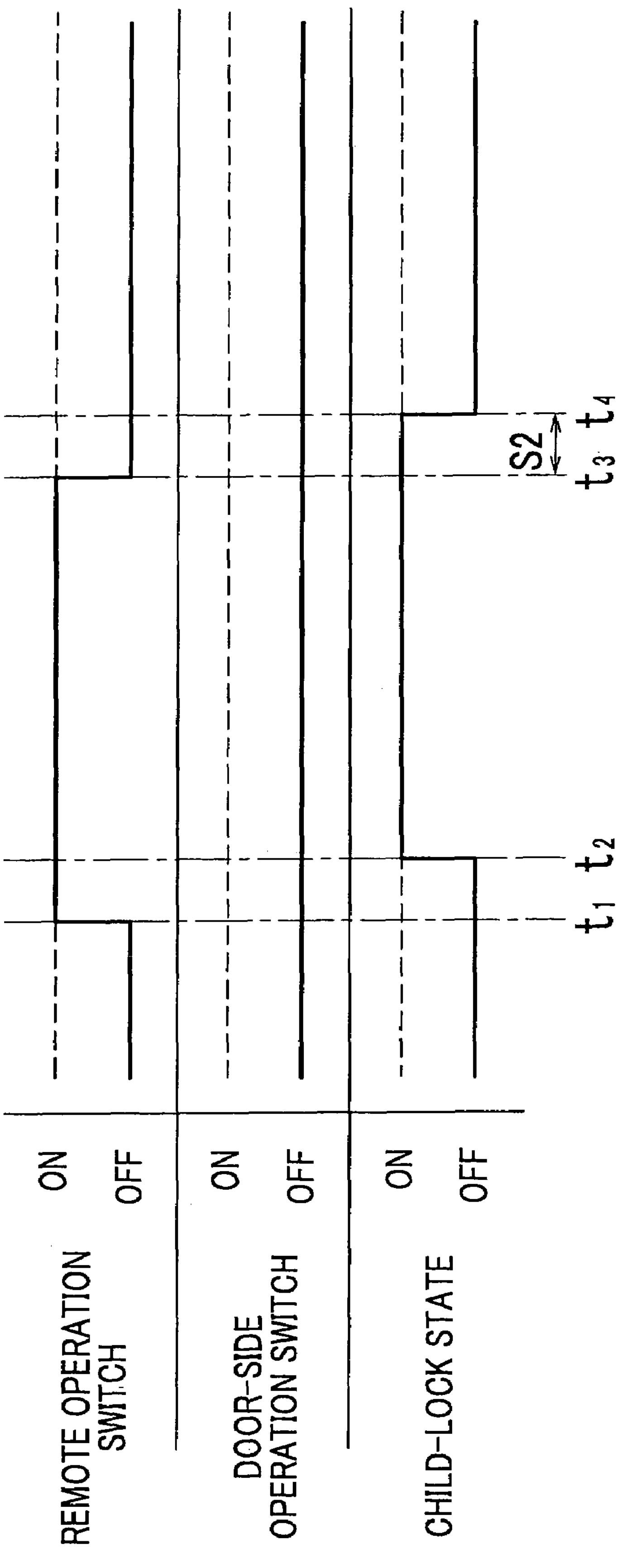
FIG. 3 is a time chart explaining an instance in which the remote operation switch is set to make the child lock function operative.

FIG. 3 is a time chart explaining an instance in which only the remote operation switch 3 is set to make the child lock function operative.

In this instance, since the door-side operation switch 4 is OFF to make the child lock function non-operative, the ECU 1 locks or unlocks the child lock based on the operating condition of the remote operation switch 3. The ECU 1 locks the child lock regardless of the driving conditions of the vehicle.

To be more specific, at the time point t1 the ECU 1 detects that the remote operation switch 3 provided at the driver seat is ON. In order to set the child lock, at the time point t2 delayed for a certain time from the time point t1, the ECU 1 controls so that a drive current flows to the door lock actuator 14 in the forward direction. The door lock actuator 14 is then actuated and child-locks the door 30. The child-lock state of the door becomes ON.

At the time point t3, the remote operation switch 3 is switched to OFF to make the child lock function non-operative. After a certain time S2 elapses, the ECU 1 outputs the driving current to the door lock actuator 14 in the reverse direction and unlocks the child lock. The child-lock state of the door 30 becomes OFF. It should be noted that the certain time S2 is set to be shorter than the certain time S1. Therefore, when the remote operation switch 3 is operated to unlock the child lock, the time required for unlocking the child lock can be decreased, thereby allowing a preparation for an emergency.

Figure 4:
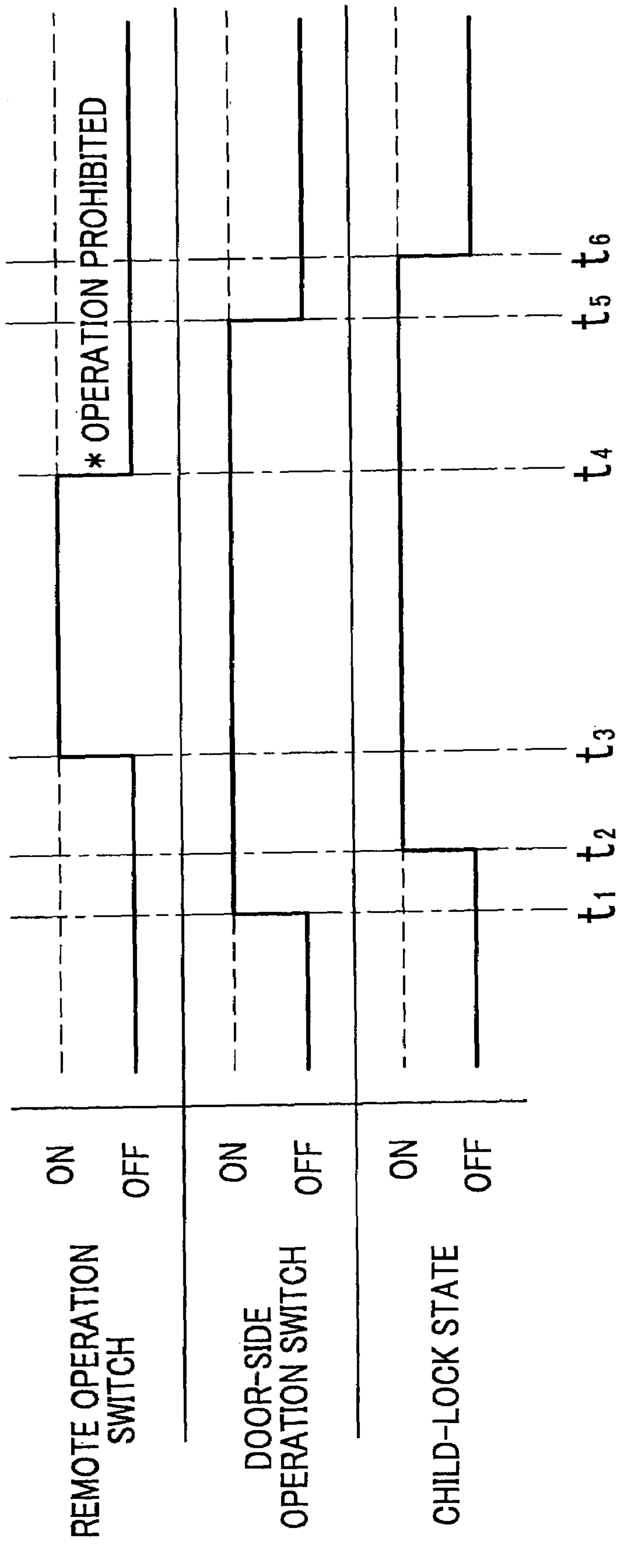
FIG. 4 is a time chart explaining an instance in which the door-side operation switch is set to make the child lock function operative.

FIG. 4 is a time chart explaining an instance in which the door-side operation switch 4 is set to make the child lock function operative.

In this instance, since the door-side operation switch 4, to which is given higher priority, is ON to make the child lock function operative, the ECU 1 locks or unlocks the child lock by taking the operating conditions of the door-side operation switch 4 into priority account. The ECU 1 locks the child lock regardless of the driving conditions of the vehicle.

At the time point t1, the door 30 is open (FIG. 5) and the door-side operation switch 4 is manipulated to ON. At the time point t2 that is slightly delayed from the time point t1, the ECU 1 controls so that a driving current flows to the door lock actuator 14 in the forward direction. The door lock actuator 14 is then actuated and child-locks the door. The child-lock state of the door becomes ON. Therefore, even if the remote operation switch 3, to which is given lower priority, is manipulated to ON at the time point t3, the child-lock state remains ON.

AT time point t4, the remote operation switch 3 is manipulated to OFF. However, since the ECU 1 gives priority to the setting of the door-side operation switch 4, the operation for unlocking the child lock made by the remote operation switch 3 is prohibited and the child lock-state of the door 30 remains ON.

At the time point t5, the door 30 is open from the outside of the vehicle by the door outer handle and the door-side operation switch 4 is manipulated to OFF. The ECU 1 then unlocks the child lock after a certain period of time elapses, that is, at the time point t6. Unlocking the child lock makes it possible to open the door by the door inner handle.

As described above, the door is automatically child-locked while the vehicle is running. This can provide a reliable setting of the child lock as well as eliminate setting the child lock, which as in the case of the prior art child lock apparatus, requires to open the door while the vehicle stops and to manipulate the child lever.

Further, when it is determined that the vehicle has stopped, the door is unlocked after the certain time S1 elapses. This can reliably retain the child-lock state while the vehicle is running. Also, this can prevent frequent operations of the door lock actuator 14 caused by temporal stops of the vehicle, decreasing occurrence of the operation noise.

Instead of providing the certain time S1, it may be possible to unlock the child lock to enable the door opening operation, for example, only when the door inner handle 31 is manipulated. As is the case with the above example, it is possible to reliably retain the child-lock state during the running of the vehicle as well as to prevent frequent operations of the door lock actuator 14 caused by temporal stops of the vehicle.

Further, providing the remote operation switch 3 for locking and unlocking the child lock of the door allows the driver to set the child lock at the driver seat. It is also possible to child-lock the door while the vehicle stops, the condition of which is not usually reflected upon setting the child lock based on the driving conditions of the vehicle. By providing the remote operation switch 3, as is the case with the conventional child lock apparatus, the door can be child-locked not only while the vehicle is running but also while the vehicle stops.

Since the door-side operation switch 4, which is operative while the door is open and which can lock or unlock the child lock of the door 30, is provided other than the remote operation switch, more reliable child-locking of the door is performed. For urgent measures such as malfunction, the child lock can be unlocked by opening the door and manipulating this manual setting switch, regardless of the conditions of the remote operation switch 3.

The child lock apparatus according to the present invention is also applicable to other vehicles with an automatic opening/closing mechanism for automatically opening and closing the door. In the case where the child lock apparatus is adapted to a vehicle with an automatic opening/closing mechanism or a keyless system, the child lock apparatus can be operated below.

For example, in the case of a power slide door, a power door lock system 9 (automatic opening/closing means) for controlling the power slide door is connected to the ECU 1 as illustrated in FIG. 1. In the case where the vehicle is provided with a keyless system for locking and unlocking the door without using a key, the keyless receiving unit 7 is connected to the ECU 1.

For example, if electric signals from the keyless receiving unit 7 and the power door lock system 9 indicate that the operation of the power door lock system 9 is prohibited or that the operation of the main switch for opening and closing the door is prohibited, the ECU 1 sets the child lock notwithstanding that the remote operation switch 3 and the door-side operation switch 4 are set to make the child lock function non-operative.

In this instance, unlocking the child lock may be performed when a certain period of time elapses after the vehicle stops and further when the door inner handle is manipulated.

In this example, in addition to prohibiting the operation of the power door lock system 9, a further condition is considered to child-lock the door. Therefore, even if prohibiting the operation of the power door lock system 9 is not sufficient to deal with the case such that the door is manually opened or closed, the door can be reliably child-locked for various situations including during the running of the vehicle.

Although unlocking the child lock during the running of the vehicle is performed when the P (Parking) position switch 5 indicates that the vehicle stops. However, the information from the P (Parking) position switch 5 is not essential. It is possible to detect vehicle speed to determine whether the vehicle stops.

Although the present invention has been described above with reference to specific embodiments thereof, it is to be understood that various changes and modifications may be made without departing from the scope of the invention.

What is claimed is:

1. A child lock apparatus capable of electrically controlling a child lock function, which disables a door opening operation when a door of a vehicle is opened from a vehicle cabin side by operating a door inner handle, said door being provided with an automatic opening/closing means for automatically opening and closing the door, the child lock apparatus comprising:

a child lock mechanism which child-locks the door;

a driving condition detector; and a controller which controls the child lock mechanism based on driving conditions of the vehicle detected by the driving condition detector;

said controller including:

a means for central processing a signal from the driving condition detector to determine when the vehicle is running and for central processing a signal from the automatic opening/closing means to determine when operation of the automatic opening/closing means is prohibited; and a means for controlling the child lock mechanism to child-lock the door when one of said central processing means determines that the vehicle is running and that operation of the automatic opening/closing means is prohibited.

2. A child lock apparatus according to claim 1, wherein said controller includes a means for central processing a signal from the driving condition detector to determine when the vehicle is stopped while the door has been child-locked, said controller further including a means for unlocking to unlock the child lock mechanism at a time when the door inner handle is operated when said central processing means determines that the vehicle is stopped while the door has been child-locked.

3. A child lock apparatus according to claim 1, wherein said controller includes a means for central processing a signal from the driving condition detector to determine when the vehicle is stopped while the door has been child-locked, said controller further including a means for unlocking the child lock mechanism to unlock the door after a predetermined time elapses from when said central processing means determines that the vehicle is stopped while the door has been child-locked.

4. A child lock apparatus according to claim 1, said controller includes a means for central processing a signal from the driving condition detector to determine when the vehicle is stopped while the door has been child-locked, said controller further including a means for unlocking the child lock mechanism to unlock the child-lock after a predetermined time elapses and at a time when the door inner handle is operated when said central processing means determines that the vehicle is stopped while the door has been child-locked.

5. A child lock apparatus according to claim 1, wherein even if a manipulation for unlocking the child lock is carried out while the vehicle is running, the controller continuously child-locks the door.

6. A child lock apparatus capable of electrically controlling a child lock function, which disables a door opening operation when a door of a vehicle is opened from a vehicle cabin side by operating a door inner handle, the child lock apparatus comprising:

a child lock mechanism which child-locks the door;

a driving condition detector; and a controller which controls the child lock mechanism based on driving conditions of the vehicle detected by the driving condition detector;

said controller including:

a means for central processing a signal from the driving condition detector to determine when the vehicle is running and for central processing a signal from the driving condition detector to determine when the vehicle is stopped while the door has been child-locked;

a means for locking the child lock mechanism to child-lock the door when said central processing means determines that the vehicle is running; and a means for unlocking the child lock mechanism at a time when the door inner handle is operated when said central processing means determines that the vehicle is stopped while the door has been child-locked.

7. A child lock apparatus according to claim 6, wherein even if a manipulation for unlocking the child lock is carried out while the vehicle is running, the controller continuously child-locks the door.

8. A child lock apparatus capable of electrically controlling a child lock function, which disables a door opening operation when a door of a vehicle is opened from a vehicle cabin side by operating a door inner handle, the child lock apparatus comprising:

a child lock mechanism which child-locks the door;

a driving condition detector; and a controller which controls the child lock mechanism based on driving conditions of the vehicle detected by the driving condition detector;

said controller including:

a means for central processing a signal from the driving condition detector to determine when the vehicle is running and for central processing a signal from the driving condition detector to determine when the vehicle is stopped while the door has been child-locked;

a means for locking the child lock mechanism to child-lock the door when said central processing means determines that the vehicle is running; and a means for unlocking the child lock mechanism to unlock the door after a predetermined time elapses from when said central processing means determines that the vehicle is stopped while the door has been child-locked.

9. A child lock apparatus according to claim 8, further comprising an automatic child lock setting switch for locking and unlocking the child lock, wherein the controller controls the child lock mechanism in accordance with operating conditions of the automatic child lock setting switch to thereby child-lock the door.

10. A child lock apparatus according to claim 9, further comprising a manual setting switch for locking and unlocking the child lock, which is arranged on the door in such a position to allow an operation thereof with the door open, wherein the controller child-locks the door by giving a priority to the manual setting switch over the automatic child lock setting switch.

11. A child lock apparatus according to claim 8, wherein even if a manipulation for unlocking the child lock is carried out while the vehicle is running, the controller continuously child-locks the door.

12. A child lock apparatus according to claim 11, further comprising a manual setting switch for locking and unlocking the child lock, which is arranged on the door in such a position to allow an operation thereof with the door open, wherein the controller child-locks the door by giving a priority to the manual setting switch over the automatic child lock setting switch.

13. A child lock apparatus capable of electrically controlling a child lock function, which disables a door opening operation when a door of a vehicle is opened from a vehicle cabin side by operating a door inner handle, the child lock apparatus comprising:

a child lock mechanism which child-locks the door;

a driving condition detector; and a controller which controls the child lock mechanism based on driving conditions of the vehicle detected by the driving condition detector;

said controller including:

a means for central processing a signal from the driving condition detector to determine when the vehicle is running and for central processing a signal from the driving condition detector to determine when the vehicle is stopped while the door has been child-locked;

a means for locking the child lock mechanism to child-lock the door when said central processing means determines that the vehicle is running; and a means for unlocking the child lock mechanism to unlock the door after a predetermined time elapses and at a time when the door inner handle is operated when said central processing means determines that the vehicle is stopped while the door has been child-locked.

14. A child lock apparatus according to claim 13, further comprising an automatic child lock setting switch for locking and unlocking the child lock, wherein the controller controls the child lock mechanism in accordance with operating conditions of the automatic child lock setting switch to thereby child-lock the door.

15. A child lock apparatus according to claim 14, further comprising a manual setting switch for locking and unlocking the child lock, which is arranged on the door in such a position to allow an operation thereof with the door open, wherein the controller child-locks the door by giving a priority to the manual setting switch over the automatic child lock setting switch.

16. A child lock apparatus according to claim 13, wherein even if a manipulation for unlocking the child lock is carried out while the vehicle is running, the controller continuously child-locks the door.

17. A child lock apparatus according to claim 16, further comprising a manual setting switch for locking and unlocking the child lock, which is arranged on the door in such a position to allow an operation thereof with the door open, wherein the controller child-locks the door by giving a priority to the manual setting switch over the automatic child lock setting switch.

18. A child lock apparatus capable of electrically controlling a child lock function, which disables a door opening operation when a door of a vehicle is attempted to be opened from a vehicle cabin side by operating a door inner handle, the child lock apparatus comprising:

a child lock mechanism which child-locks the door;

an automatic child lock setting switch for locking and unlocking the child lock;

a manual setting switch for locking and unlocking the child lock, arranged on the door in such a position to allow an operation thereof with the door open;

a controller which controls the child lock mechanism based on driving conditions of the vehicle detected by a driving condition detector;

wherein the controller controls the child lock mechanism to child-lock the door if the driving condition detector detects that the vehicle is running;

wherein the controller controls the child lock mechanism in accordance with operating conditions of the automatic child lock setting switch to thereby child-lock the door;

wherein the controller child-locks the door by giving a priority to the manual setting switch over the automatic child lock setting switch.

* * * * *